United States Patent
Castaldo et al.

(10) Patent No.: US 6,774,709 B2
(45) Date of Patent: Aug. 10, 2004

(54) VOLTAGE REGULATOR FOR A CHARGE PUMP CIRCUIT

(75) Inventors: Enrico Castaldo, Catania (IT); Antonino Conte, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/379,416

(22) Filed: Mar. 4, 2003

(65) Prior Publication Data

US 2003/0218453 A1 Nov. 27, 2003

(30) Foreign Application Priority Data

Mar. 4, 2002 (IT) ..................................... VA2002A0020

(51) Int. Cl.[7] .............................................. G05F 1/10
(52) U.S. Cl. ..................................... 327/536; 327/540
(58) Field of Search ................................. 327/536, 540, 327/534, 535, 537; 365/226

(56) References Cited

U.S. PATENT DOCUMENTS 6,456,153 B2 * 9/2002 Buck et al. ................. 327/536
6,642,774 B1 * 11/2003 Li .............................. 327/536

* cited by examiner

Primary Examiner—Shawn Riley
(74) Attorney, Agent, or Firm—Lisa K. Jorgenson; Allen, Dyer, Doppelt, Milbrath & Gilchrist, P.A.

(57) ABSTRACT

A circuit for regulating an output voltage of a charge pump includes a regulator connected to an output of the charge pump. The regulator includes a voltage divider for dividing the output voltage. A filter has a first input for receiving the divided output voltage, a second input for receiving a control signal, and an output for providing a filtered divided output voltage. A comparator has a first input for receiving the divided output voltage, a second input for receiving a reference voltage, a third input for receiving the filtered divided output voltage, and an output for providing a digital signal based upon a comparison of the divided output signal, the reference voltage and the filtered divided output voltage. A logic control circuit has a first input for receiving a clock signal, a second input for receiving the digital signal from the comparator, and an output for providing a timing signal. A phase generator circuit has an input for receiving the timing signal from the logic control circuit for generating control phases for the charge pump.

25 Claims, 16 Drawing Sheets

VOLTAGE REGULATOR FOR A CHARGE PUMP CIRCUIT

FIELD OF THE INVENTION

The present invention relates in general to integrated digital circuits, and more particularly, to a voltage regulator for a charge pump generating a high voltage (HV) starting from the supply voltage of the integrated circuit.

BACKGROUND OF THE INVENTION

In EEPROM memory devices it is necessary to keep the high voltage, generated by the charge pump for programming and erasing operations (12–15 V), as constant as possible independently of the required driving capability, which is on the order of tens of $\mu A$. It is important that a certain and stable output voltage $V_{out}$ be produced to ensure that it will not surpass the limit imposed by the dielectric strength of oxides of transistor structures, as well as of capacitors, to prevent the risk of permanently damaging them.

The basic diagram of FIG. 1 illustrates a commonly implemented regulator. A desired $V_{reg}$ (regulation voltage) is generated inside the integrated device, based on a known and very stable voltage reference (BandGap circuit), and is input to a comparator that compares it with the output voltage $V_{out}$ of the charge pump.

When $V_{out} > V_{reg}$, the regulator sends a logic signal $V_{ON}$ to a control circuit that stops the application of clock pulses to the phase generator. As a consequence, the charge pump starts to discharge, and as soon as $V_{out} < V_{reg}$, the regulator re-enables the driving action of the clock on the phase generator.

With this feedback, a dynamic equilibrium at the steady state condition $V_{out} = V_{reg}$ is eventually reached. In a loadless condition, the charge pump is practically turned off, with the evident advantage (especially for minimizing power consumption) of not wasting power. When a load absorbs current, the regulator enables clock pulses to drive the charge pump at a frequency $f_0$ sufficient for precisely compensating the drop of $V_{out}$ because of the delivering of an electrical charge.

The current-voltage characteristic of an N stage pump of capacitance C, supplied at the supply voltage $V_{dd}$ and regulated with a frequency $f_0 \leq f_{max}$ is shown in FIG. 2. The charge pump generates a constant output voltage $V_{out} = V_{reg}$ for any load current, up to the current $I_{0,max}$ compatible with that voltage.

When the load absorbs a certain current $I_0$, the regulator adjusts the frequency of the clock pulses that reach the phase generator in the neighborhood of a frequency $f_0$ smaller than $f_{max}$, making the pump work at the operating point ($V_{out} = V_{reg}$, $I_{out} = I_0$). In practice, it is as if the slope of the load line had been modified to determine the appropriate output resistance $R_{out}$.

The ideal characteristic of FIG. 2 satisfies the following equation:

$$I_{out} = \frac{fC}{N}((N+1)V_{dd} - V_{out})$$

FIG. 3 shows a commonly used regulator circuit. The circuit uses a resistive voltage divider by which a certain fraction $V_R$ of the output voltage $V_{out}$ is tapped and compared by a comparator with the reference voltage $V_{BG}$ usually produced by a bandgap circuit. The output $V_{ON}$ of the comparator is a logic signal that enables or disables the passage of clock pulses from the oscillator to the phase generator. Moreover, a properly dimensioned capacitive network is connected in parallel to the voltage divider for reasons that will be explained in the following paragraph.

The regulated voltage (in terms of mean value) is equal to:

$$V_{out} = V_{BG}\left(1 + \frac{R_{UP}}{R_{DOWN}}\right)$$

The precision of the regulator is tied essentially to the speed with which the node $V_R$ responds to voltage variations of $V_{out}$ for restoring the condition $V_R = V_{BG}$. If the resistors were ideal, the response would be instantaneous. In reality, the variation of $V_{out}$ propagates to the input of the comparator only after the voltage on the parasitic (distributed) capacitances associated with the integrated resistors have changed, and this slows down the response of the regulation loop.

In order to compensate this effect, a capacitor $C_{UP}$ is introduced between the node $V_{out}$ and the node $V_R$, the size of which is chosen based upon a simulated step response, as depicted in FIG. 4. With only the resistive line, the voltage $V_R$ increases quite slowly following a sub-compensated characteristic (curve a). Taking into consideration possible uncontrollable variations of parameters, instead of compensating exactly, it is often preferable to overcompensate, in order to benefit from an enhanced reactivity of the control loop.

To avoid an undershoot (curve b) that would imply an overshoot of the regulated voltage (because the comparator would consider the interval in which $V_R < V_{BG}$ as an absence of regulation, thus letting clock pulses reach the phase generator and thus increasing the HVP level), the value of $C_{UP}$ is increased until the undershoot becomes null (curve c). Finally, for reducing the over-elongation peak that could cause spurious switching of the comparator, a capacitor $C_{DOWN}$, about four times greater than $C_{UP}$, is used (curve d).

This common regulation system is subject to dynamic problems. The more frequently the regulator must intervene (that is, the higher is the current required to be delivered by the charge pump), less readily the voltage $V_R$ follows the variations of the output voltage $V_{out}$. In other words, the response of the regulation loop becomes slower as the load current increases, and any inaccuracy of regulation in terms of an offset (difference) $V_R - V_{BG}$ present at the input of the comparator implies an error on $V_{out}$ that is equal to the offset itself amplified by the ratio $R_{UP}/R_{DOWN}$, and it may even be on the order of hundreds of mVs.

With modern technologies, this problem becomes even more severe. The reduced value of the bandgap voltage (~840 mV versus ~1.38 V for older technologies), coupled to a high value of $R_{UP}$ (for reducing current consumption through the voltage divider), renders even more difficult accurate regulation of the voltage $V_{out}$, and indeed errors of up to 300–400 mV are not infrequent.

SUMMARY OF THE INVENTION

In view of the foregoing background, the purpose of the present invention is to overcome the above described difficulties.

The objective has been fully achieved by adopting an innovative technique that includes comparing the reference bandgap voltage not only with the instantaneous value of $V_R$, as it is normally done, but also with a filtered replica thereof obtained by the use of an RC low-pass filter. In this way, even the average value of $V_R$, hereinafter called $V_{Rfilter}$, is accounted for compensating an eventual offset that may be present and that, as we have seen in the known circuits, causes a magnified error on the regulated voltage (normally the magnifying ratio $R_{UP}/R_{DOWN}$ is about 12).

An objective is thus to provide a regulator for a HV charge pump, capable of self adapting itself to the varying level of the load current, compensating the variation of the regulating effect that normally occurs between extreme operating conditions (that is, near a null load and the maximum load).

According to the present invention, a regulator of the output voltage of a charge pump operates through the whole range of variation of the current absorbed by the load of the charge pump The regulator comprises a voltage divider for the output voltage of the charge pump for tapping a certain fraction of the output voltage, and a comparator for comparing the tapped voltage fraction with a constant reference voltage applied to respective inputs of the comparator and outputting a resultant digital signal. A logic control circuit is input with a main clock signal and outputs a timing signal, the frequency of which is determined by the state of the digital signal at every pulse of the main clock signal. A circuit generates control phases of the charge pump as a function of the timing signal.

The regulator is characterized in that it further comprises a low-pass filter for the output voltage fraction, the time constant of which is automatically switched at least between two pre-established values as a function of a certain control signal generated by an integrating circuit to an input of which an inverted replica of the digital signal generated by the comparator is applied. The filtered voltage fraction is applied to a third offset input of the comparator.

According to an embodiment, the comparator has a first high gain branch, from which the output digital signal is derived, composed by a single NMOS transistor driven by the output of the low-pass filter and electrically connected in parallel to a plurality of NMOS transistors identical to the single NMOS transistor but driven in common by the fraction of the output voltage.

The other branch of the comparator is identical to the first branch but the single NMOS transistor and the plurality of NMOS transistors are all driven in common by the constant reference voltage.

DETAILED DESCRIPTION OF THE PREFERRED EMBODIMENTS

Figure 5:
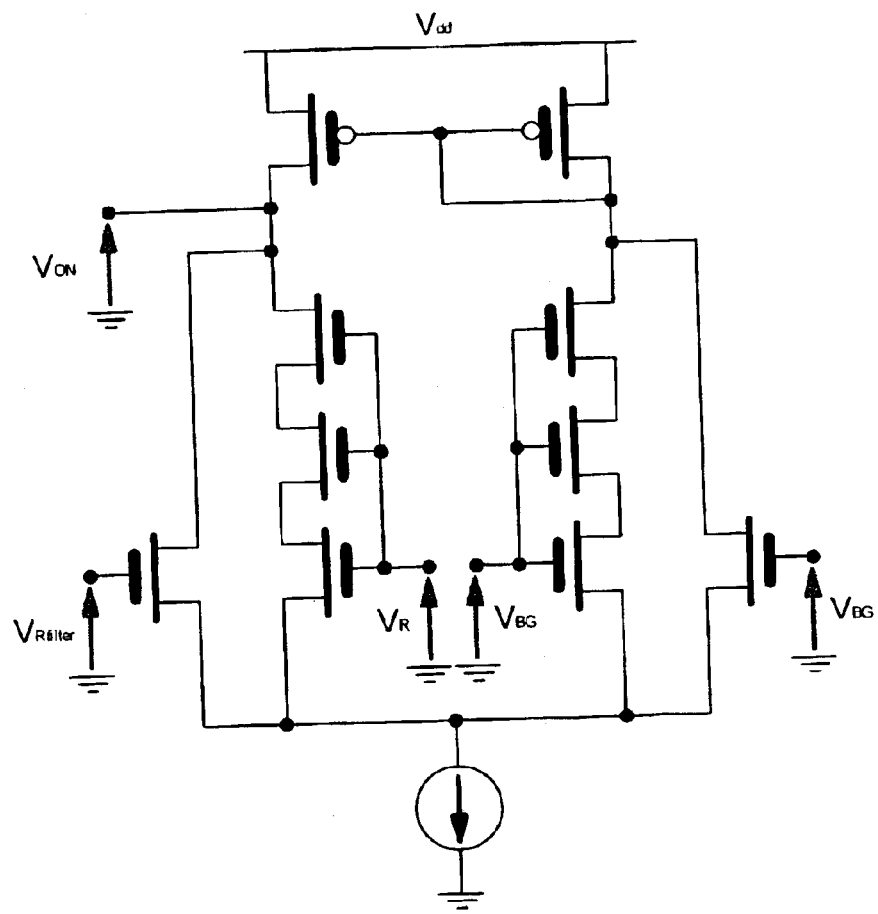
FIG. 5 shows a circuit embodiment of the comparator used in the regulator of the present invention.

According to an embodiment of the comparator shown in FIG. 5, the comparator has a first high gain branch for generating the output voltage $V_{ON}$ composed of a single NMOS transistor, driven by $V_{Rfilter}$, and connected in parallel to three NMOS transistors. The three NMOS transistors are connected together in series, driven by $V_R$ and are identical to the single NMOS transistor. The other branch is identically structured but all transistors are driven by the bandgap voltage $V_{BG}$.

The functioning principle is as follows. Assume that the mean value of $V_R$ is greater than $V_{BG}$. The transistor $M_1$ will be more conducting than $M_2$, thus contributing in letting the comparator output switch low ($V_{ON}$ low=>regulated output, the passage of clock pulses to the phase generator steps), thus introducing a compensative offset that tends to nullify the difference $V_{Rfilter}-V_{BG}$. This happens independently from the comparison between $V_R$ and $V_{BG}$ that is performed by the two internal branches of the comparator formed by an identical series connection of three transistors. Similarly, when $V_{Rfilter}<V_{BG}$, the transistor $M_1$ will be less conducting than $M_2$ unbalancing the comparator toward the opposite condition ($V_{ON}$ high=>non regulated output, the clock pulses are fed to the phase generator of the charge pump).

Preferably, all the NMOS transistors of the comparator are identical in size for simplifying the layout and, in order to attribute a different weight to the effect of voltages $V_R$ and $V_{Rfilter}$, three transistors driven by $V_R$ (equivalent to a transistor three times longer than $M_1$, thus with an overall gain reduced to a third compared to the gain of $M_1$) are used.

Figure 6:
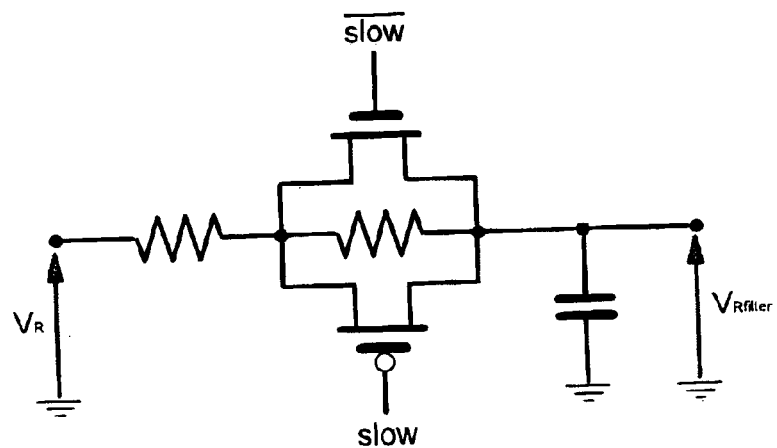
FIG. 6 shows a circuit embodiment of an RC low-pass filter used in the regulator of the present invention.

An embodiment of the adaptive RC filter is shown in FIG. 6. The filter resistance is formed by a first integrated resistor $R_1$, and by a second integrated resistor $R_2$ that may be short-circuited by a CMOS switch controlled by the phases slow and $\overline{\text{slow}}$ for reducing the time constant of the filter, and thus increasing its pass band. This increments the speed with which the regulator reacts to fast variations of the regulated output voltage. In fact, the value of the current absorbed by the load of the charge pump may change with a frequency that depends on the currently required operations, and cannot be known in advance.

Figure 7:
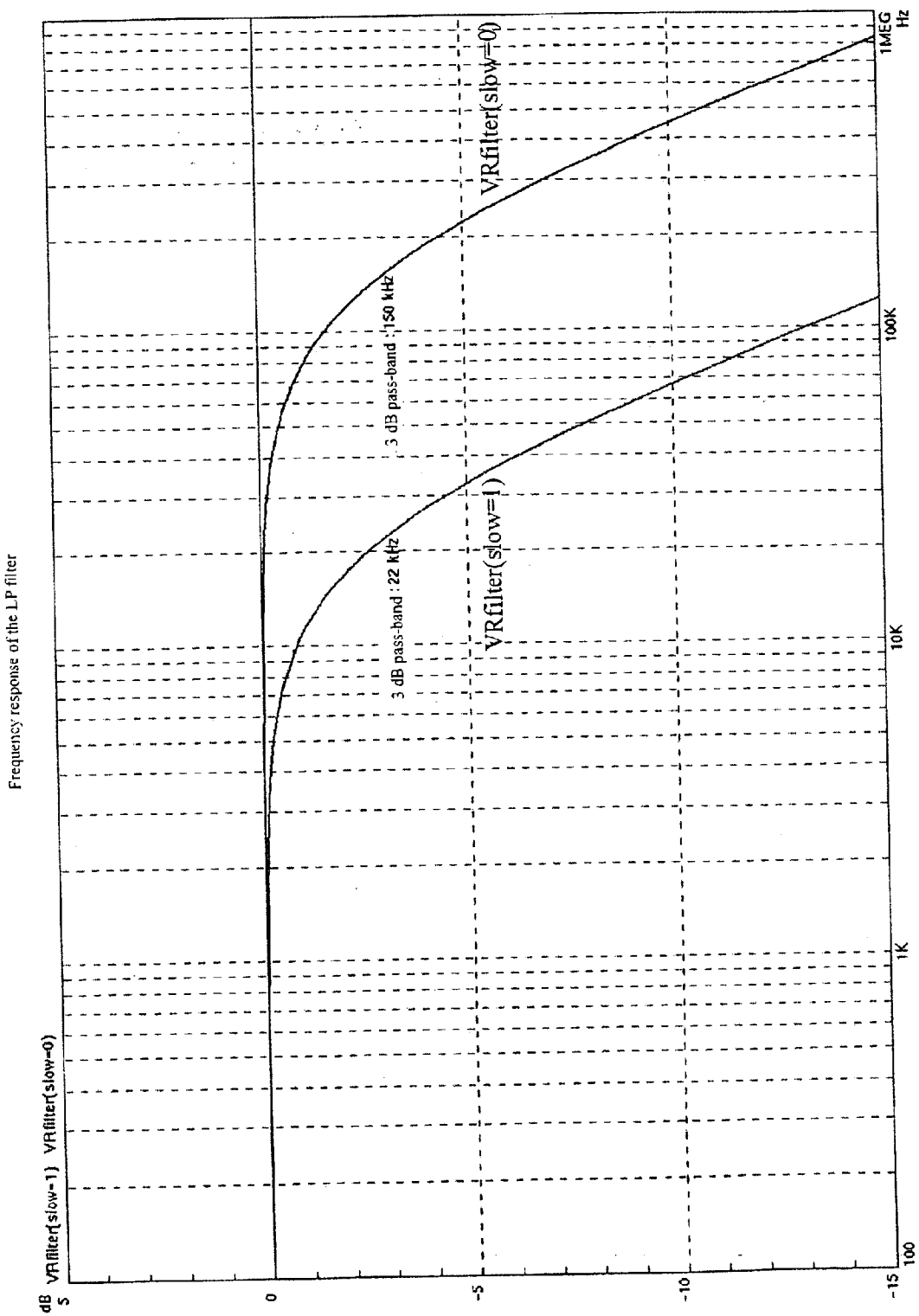
FIG. 7 illustrates the switchable pass band of the RC filter of FIG. 6.

FIG. 7 shows the frequency response of the filter of FIG. 6 (Bode diagram of the module) in the two possible configurations, corresponding to a (3 dB) cut-off frequency of about 22 kHz (slow response) and about 150 kHz (fast response), respectively.

Figure 8:
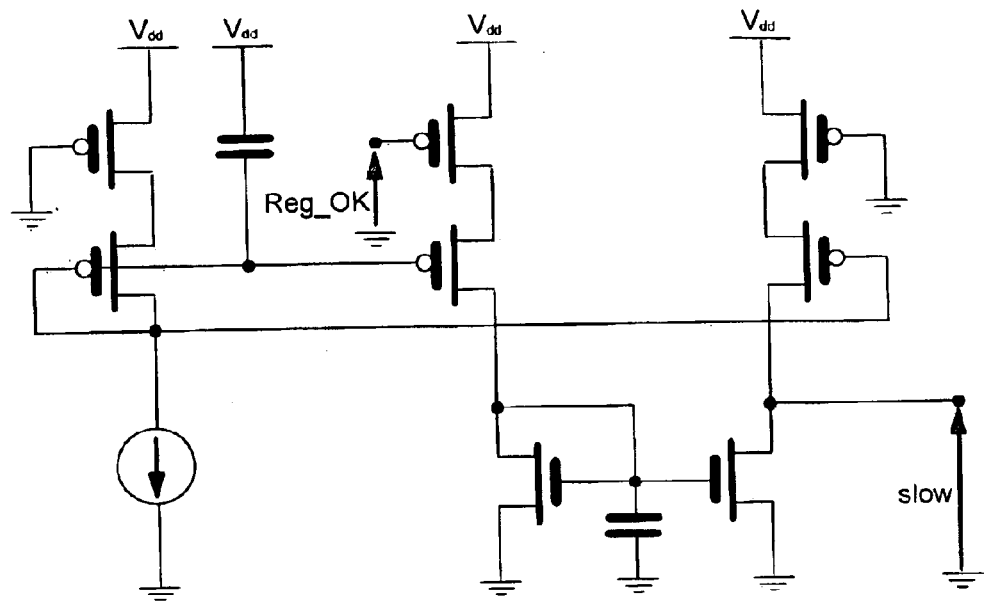
FIG. 8 shows a circuit embodiment of the integrator used in the regulator of the present invention.

The turning on/off of the CMOS switch of FIG. 6 (and thus the variation of the resistance of the filter) by the control phases slow and $\overline{\text{slow}}$ may be controlled by an integrating circuit, an embodiment of which is depicted in FIG. 8.

When the signal Reg_OK, derived from $V_{ON}$ through an inverter, is low (lack of regulation, for example because of a load current increase), the PMOS transistor driven by Reg_OK is turned on, and the current—provided by an ideal generator $I_{ref}$—charges the capacitor C, whose voltage biases the gates of the NMOS transistor mirror $M_a$–$M_b$. When the voltage on the capacitor C surpasses the threshold values of the NMOS transistors $M_a$–$M_b$ the mirror turns on and the slow signal switches low, thus the short-circuiting CMOS switch of the second resistor $R_2$ of the low pass filter of FIG. 6 closes and the regulator is set ready to track variations of $V_R$ of a higher frequency. Should the pump be in a regulated condition (Reg_OK high), the PMOS transistor controlled by Reg_OK of the integrator circuit of FIG. 8 is off. The capacitor C discharges through $M_a$ and when the mirror turns off, the signal slow switches high reducing the cut-off frequency of the RC filter that remains sufficient to follow slower evolutions of $V_R$. When the current delivered by the charge pump varies, also the duty-cycle of the signal Reg_OK varies and with it the average time interval in a period during which the signal slow is high. The average or "equivalent cut-off frequency" of the RC filter will range between the two extreme values.

This self adaptability of the characteristics of the low pass filter optimizes the performance of the regulator under different operating conditions, without imposing its ability to quickly react to load variations.

Figure 9:
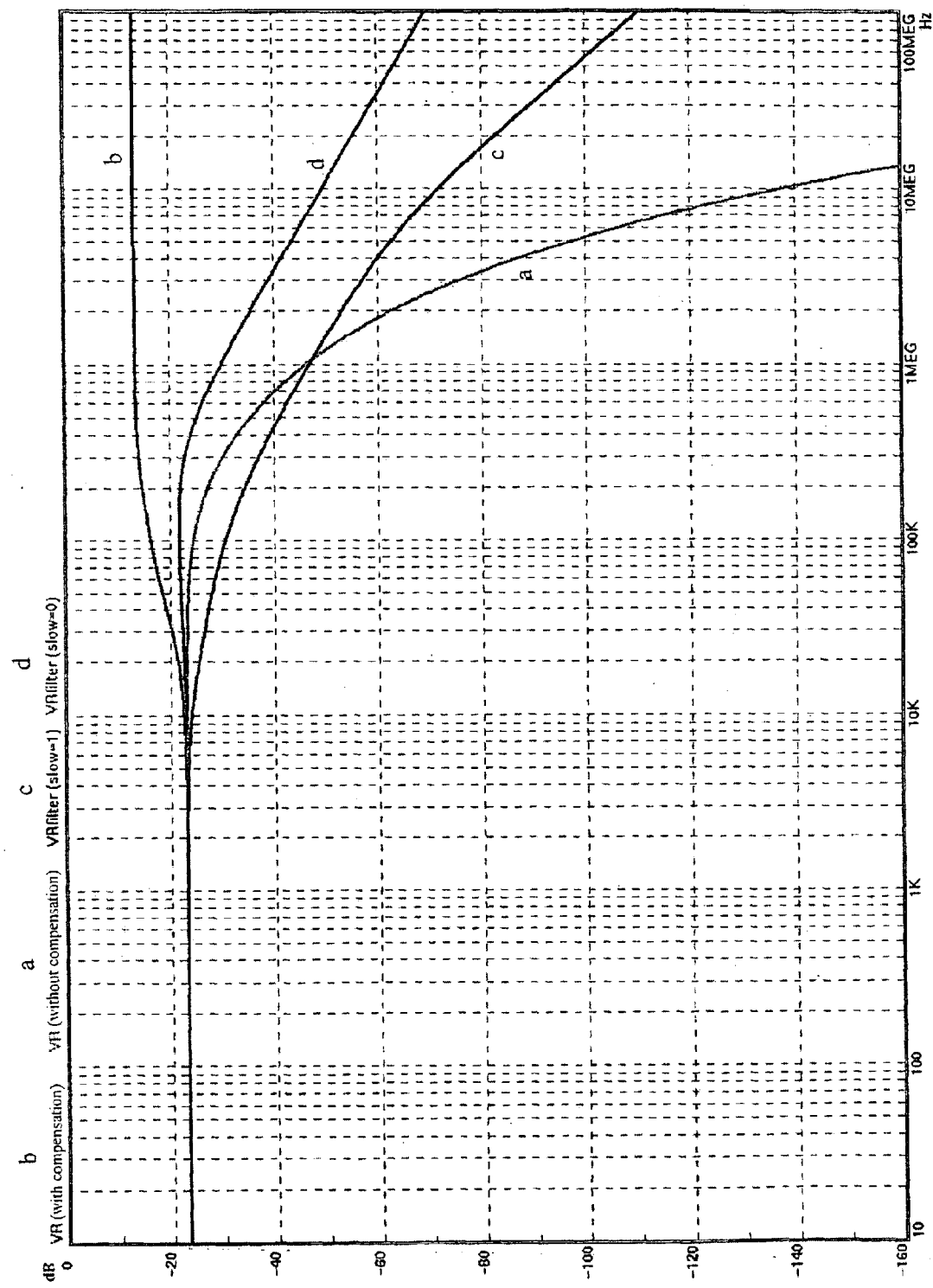
FIG. 9 shows frequency response curves according to the present invention.

FIG. 9 depicts the Bode diagrams of the fed back voltages: $V_R$ and $V_{Rfilter}$; namely $V_R$ without compensation (curve a) and with overcompensation (curve b), and $V_{Rfilter}$ with filtering at a minimum frequency (curve c) and at a maximum frequency (curve d). Without capacitors connected in parallel to the resistor voltage divider, frequencies over 25 kHz are cut off, while the compensation network allows them to pass (amplifying them). On the contrary, the response of the system voltage divider/RC filter is a low-pass filter, with a self adapting cut-off frequency.

Figure 10:
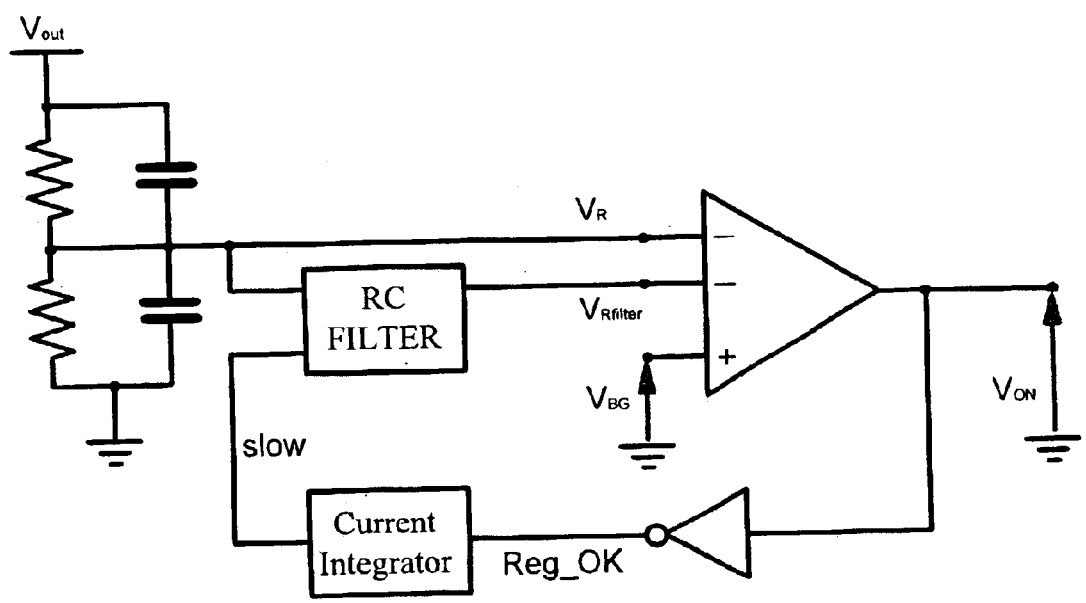
FIG. 10 is a block diagram of the regulator for a charge pump according to the present invention.

FIG. 10 shows the block diagram of the regulator of the output,voltage of a charge pump according to this invention using a comparator provided with an additional input for the compensation of the offset of the regulation level, the adaptive low pass RC filter and the integrator for charging the characteristics of the filter.

Results of Simulations

Simulations of the novel regulator under "normal" operating conditions (typical: T=27° C., $V_{dd}=V_{dd,typ}=1.65$ V); "worst" operating conditions (slow: T=125° C., $V_{dd}=V_{dd,min}=1.35$ V) and "best" operating condition (fast: T=−40° C., $V_{dd}=V_{dd,max}=1.95$ V) have been carried out.

Figure 11:
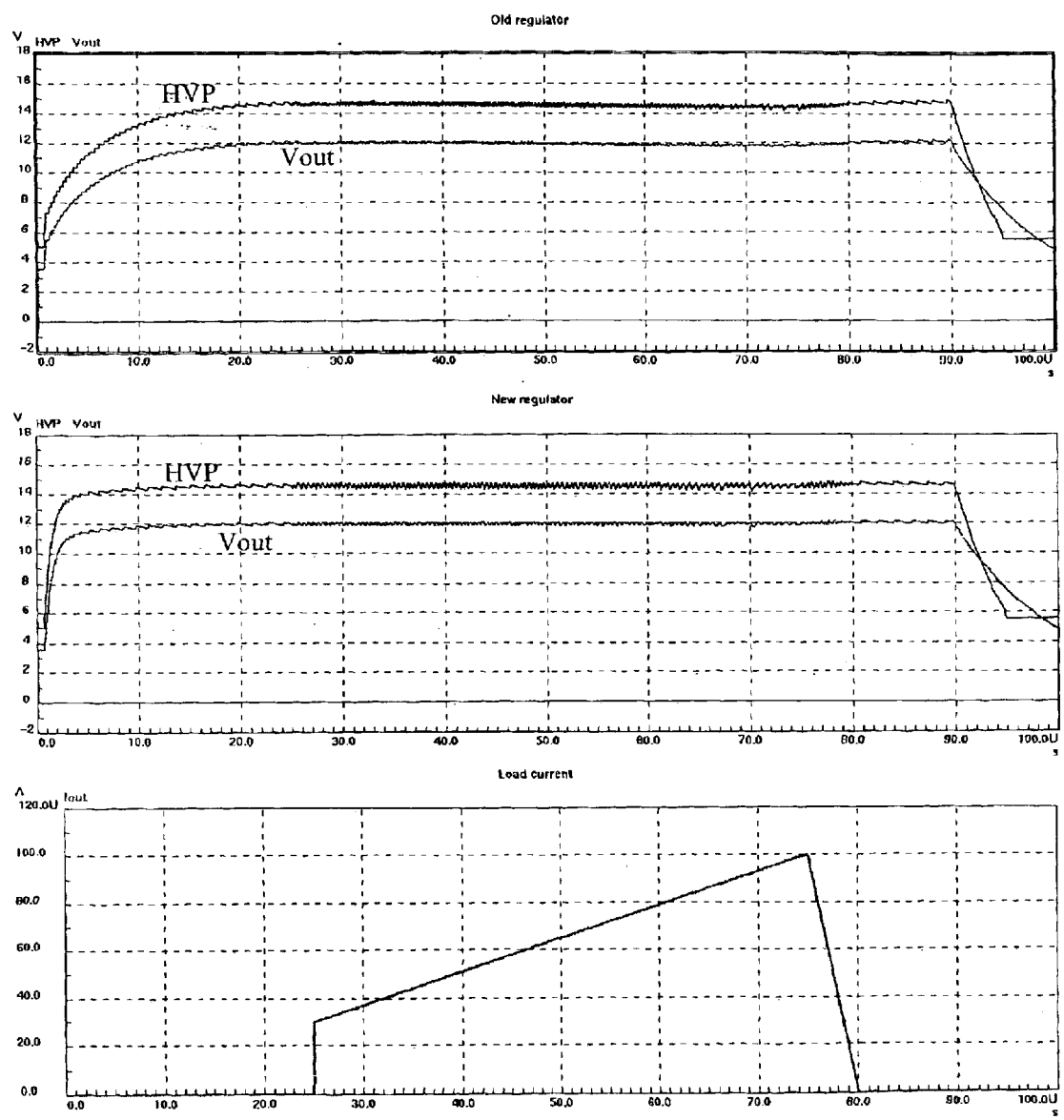
FIG. 11 shows comparative results of a simulation with variable current according to the present invention.

In FIG. 11 are shown the performances of the charge pump, respectively with a prior art regulator (old regulator) and with the regulator of this invention (new regulator) upon turning on the charge pump with no load, with a load current step of 30 $\mu$A, a ramp-up to 100 $\mu$A, a return to a loadless condition and a final turning off and discharging, for typical model conditions and at a clock frequency of 10 MHz.

The new circuit of this invention is faster in reaching a steady state and in following the variations of the load current than the known circuit, and it has a higher precision of the regulation in all conditions.

Figure 12A:
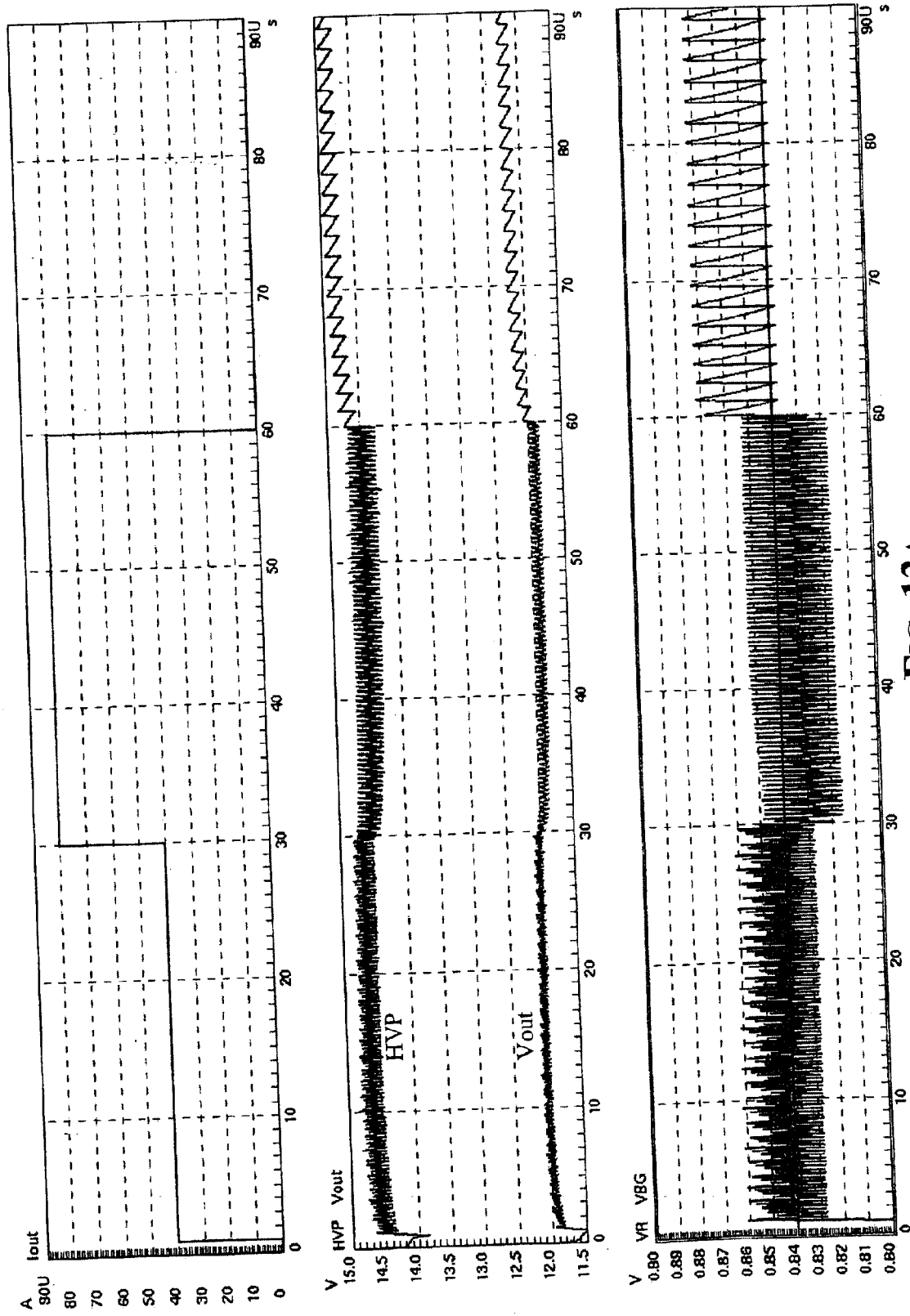
FIGS. 12a and 12b illustrate the response to a step current variation of a known regulator and of the regulator of the present invention.
Figure 12B:
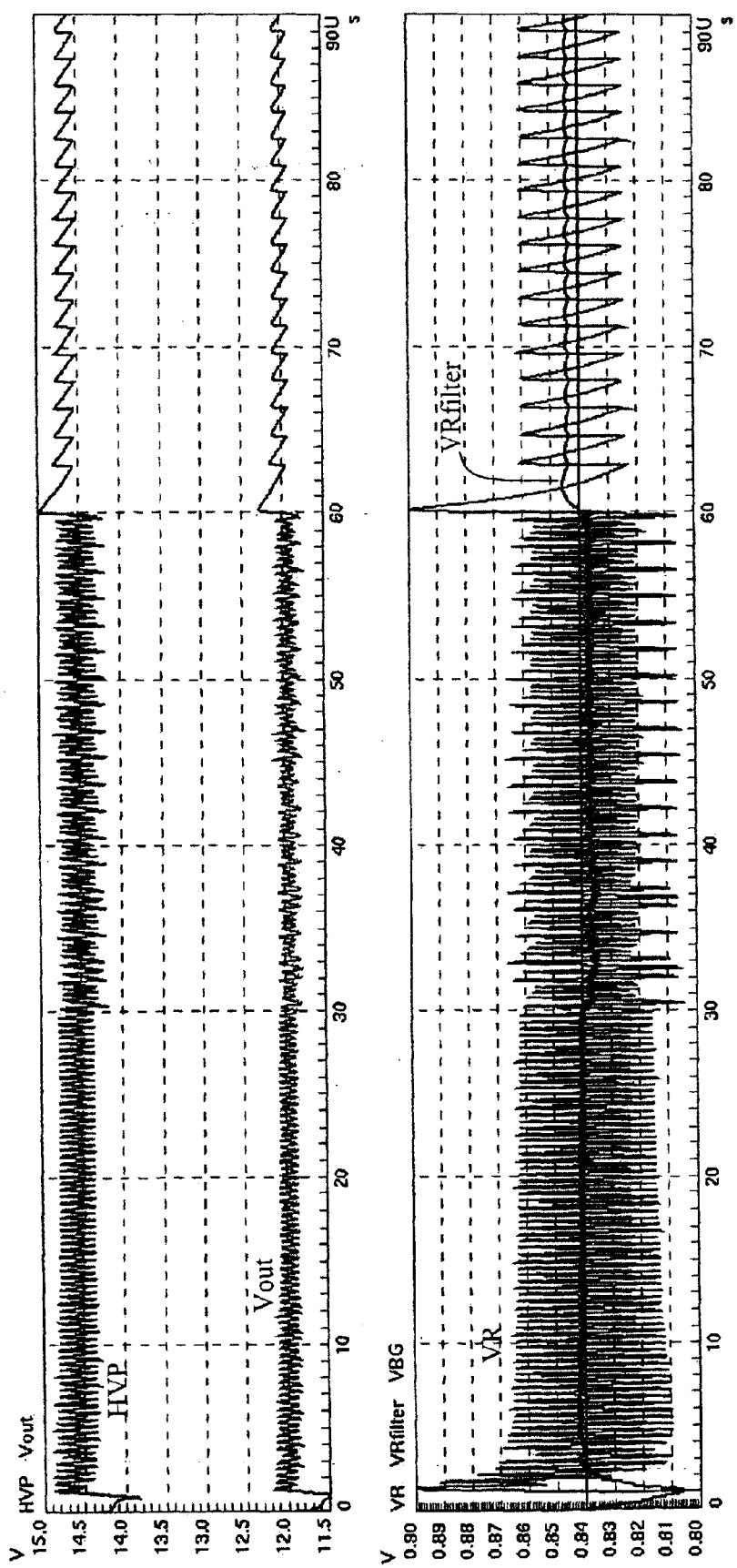

A simulation of a step response showing the functioning of the known circuit and of circuit of this invention in presence of an abrupt variations of the current absorbed by a load, from 0 to 40 $\mu$A, to 80 $\mu$A, and again to 0, is illustrated in the FIG. 12a for the prior art circuit and 12b for the novel circuit.

Figure 13A:
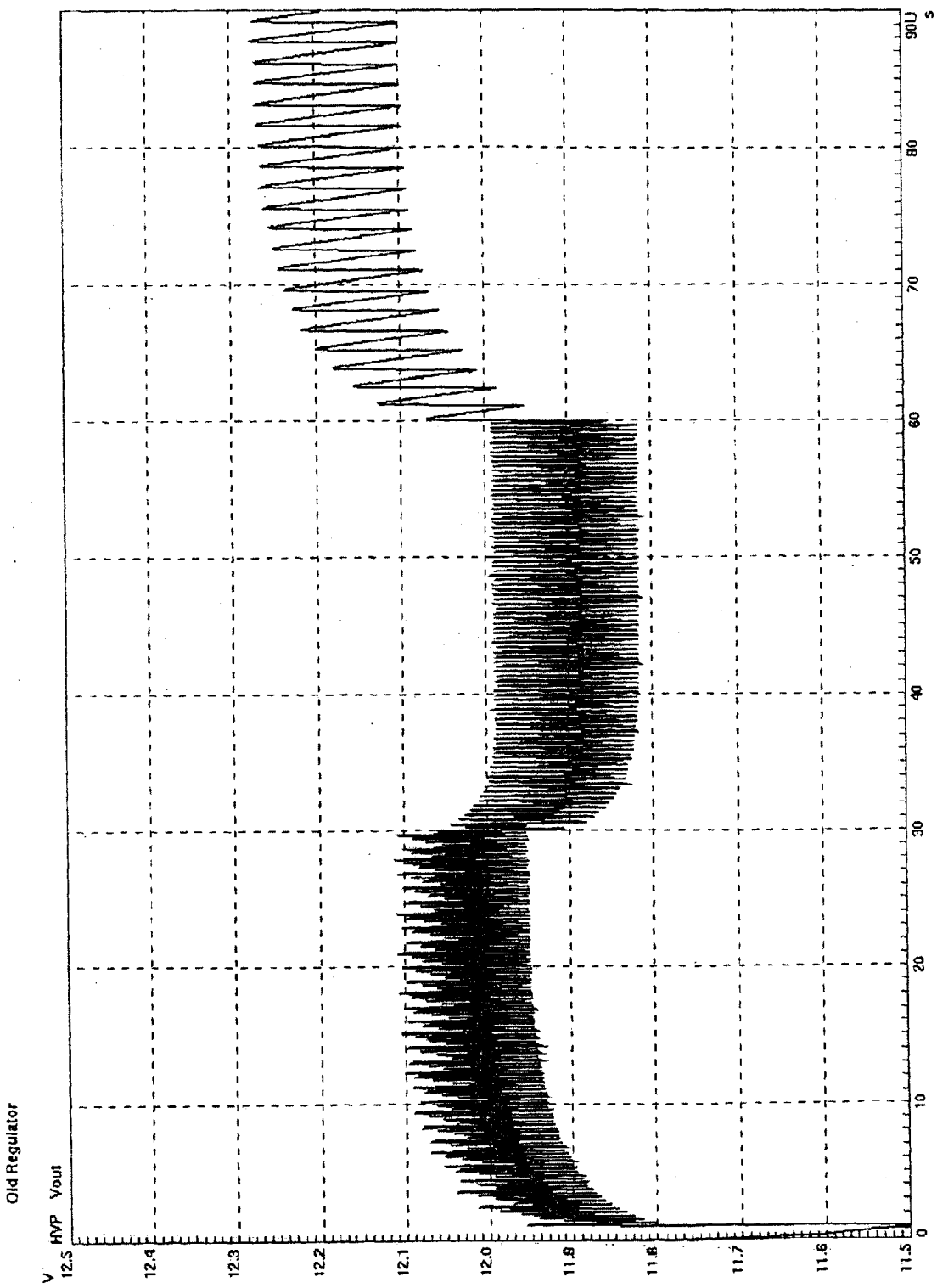
FIGS. 13a and 13b show comparative responses to a current step according to the present invention.
Figure 13B:
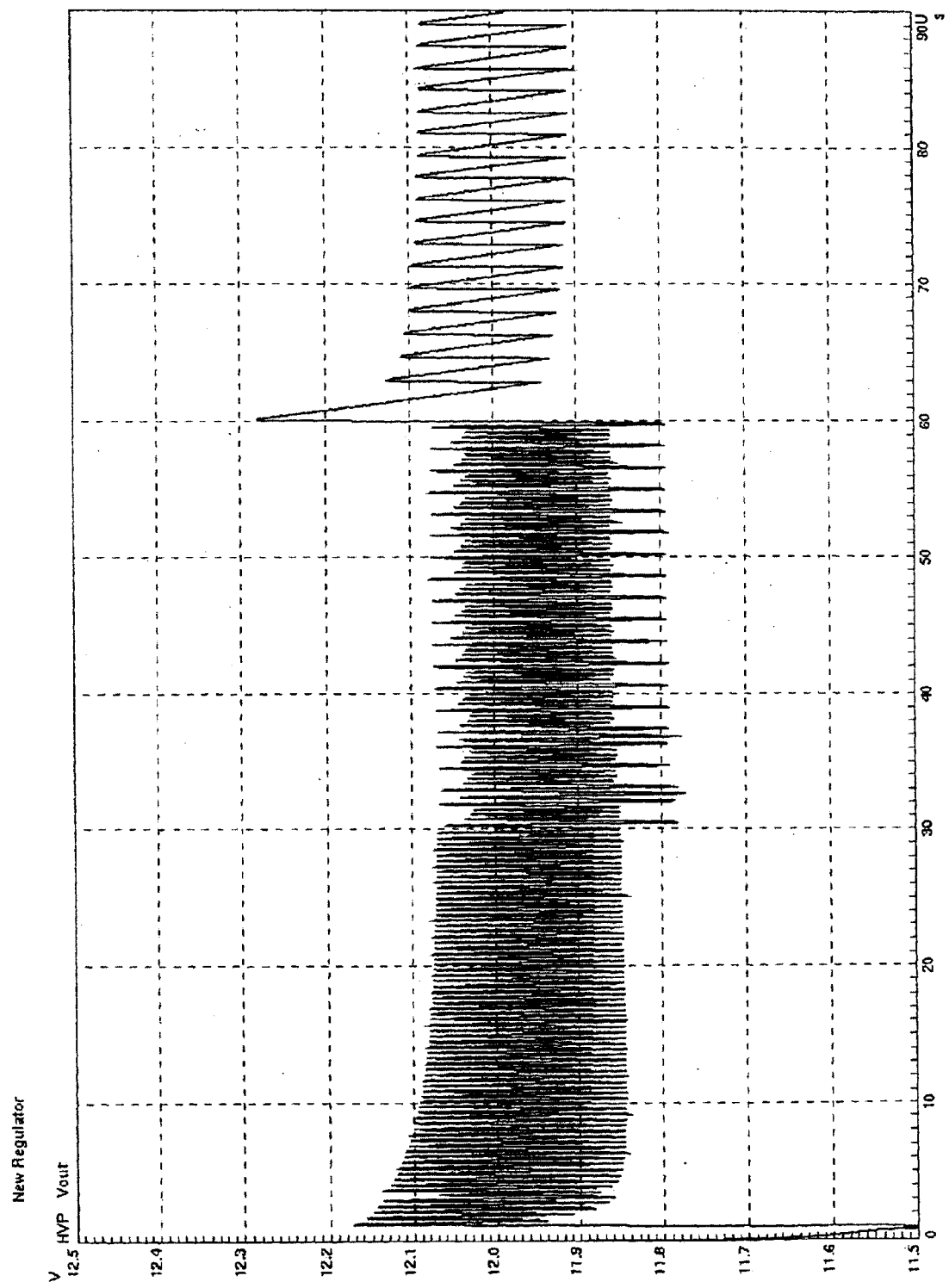

As may be easily observed, the known regulator reacts slower and with less precision than the novel circuit. Improving the response to step variations is even more evident in the magnified diagram of FIG. 13a for the prior art circuit and of FIG. 13b for the novel regulator of this invention.

Figure 14A:
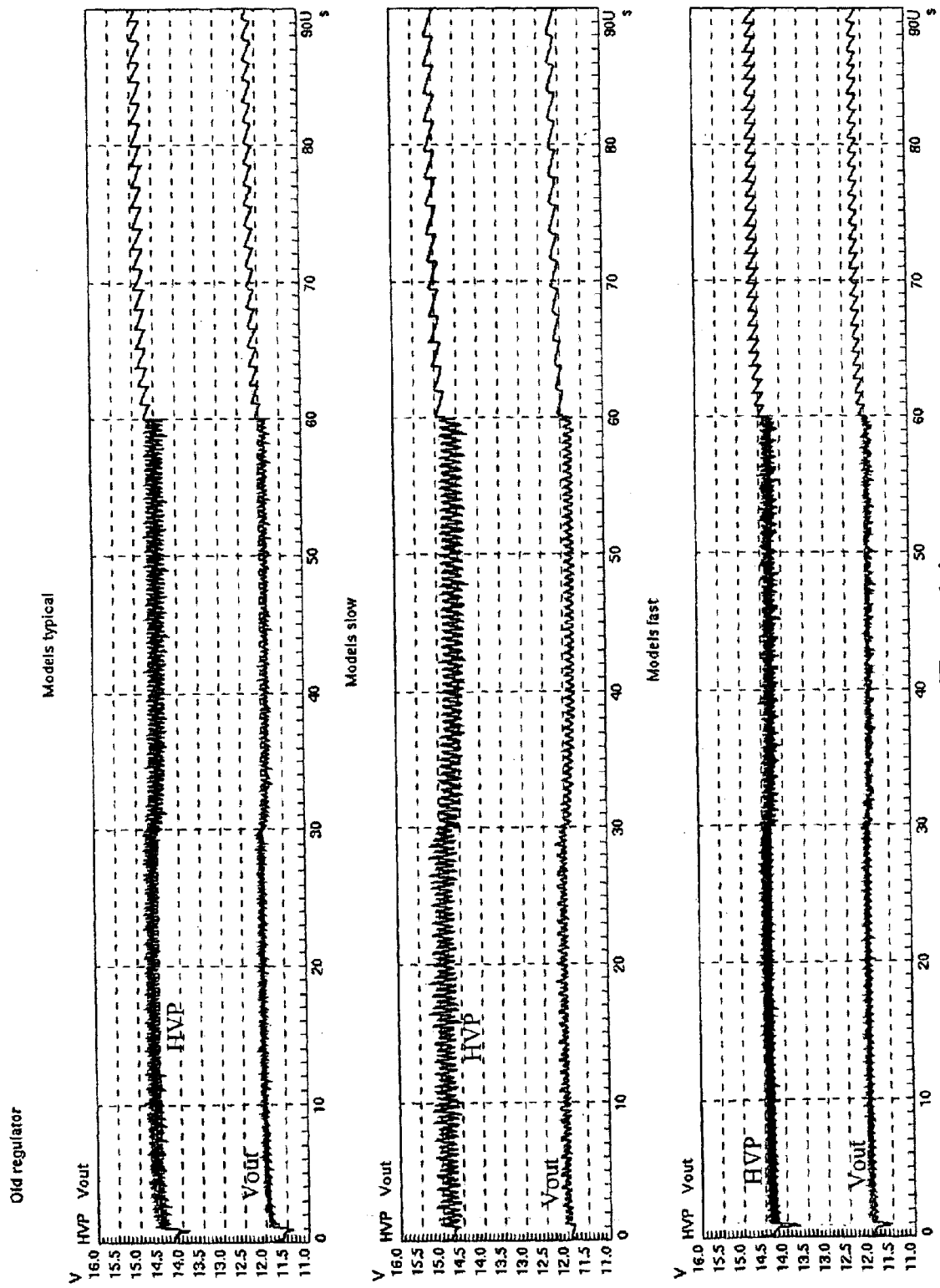
FIG. 14a and 14b show comparative responses to the current step under different conditions according to the present invention.
Figure 14B:
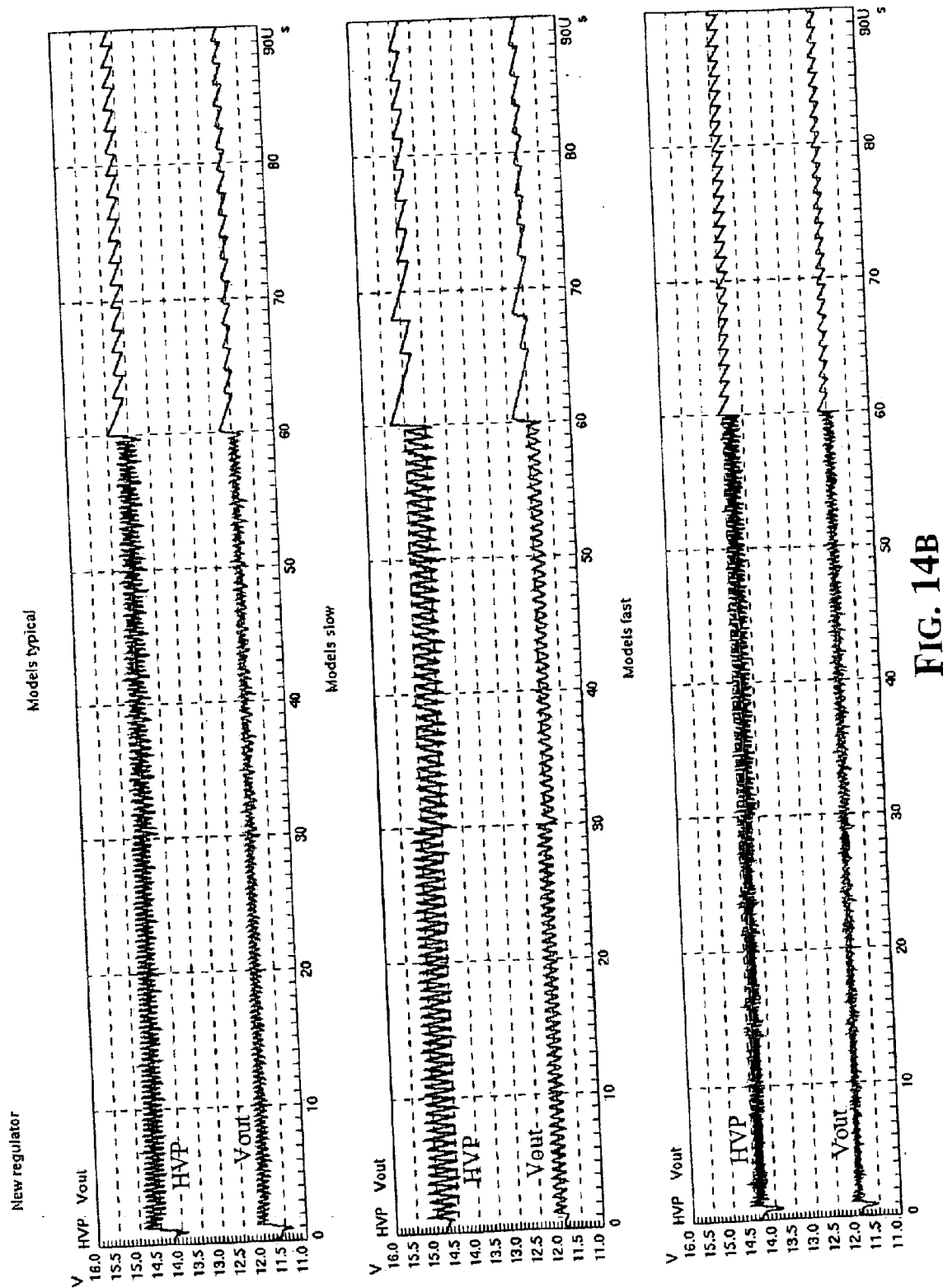

The diagrams shown in FIG. 14a for the prior art regulator and FIG. 14b for the novel regulator, confirm that a sensible improvement of the performance is recognizable in all the three above mentioned conditions of operation: "typical", "slow" and "fast".

Figure 15:
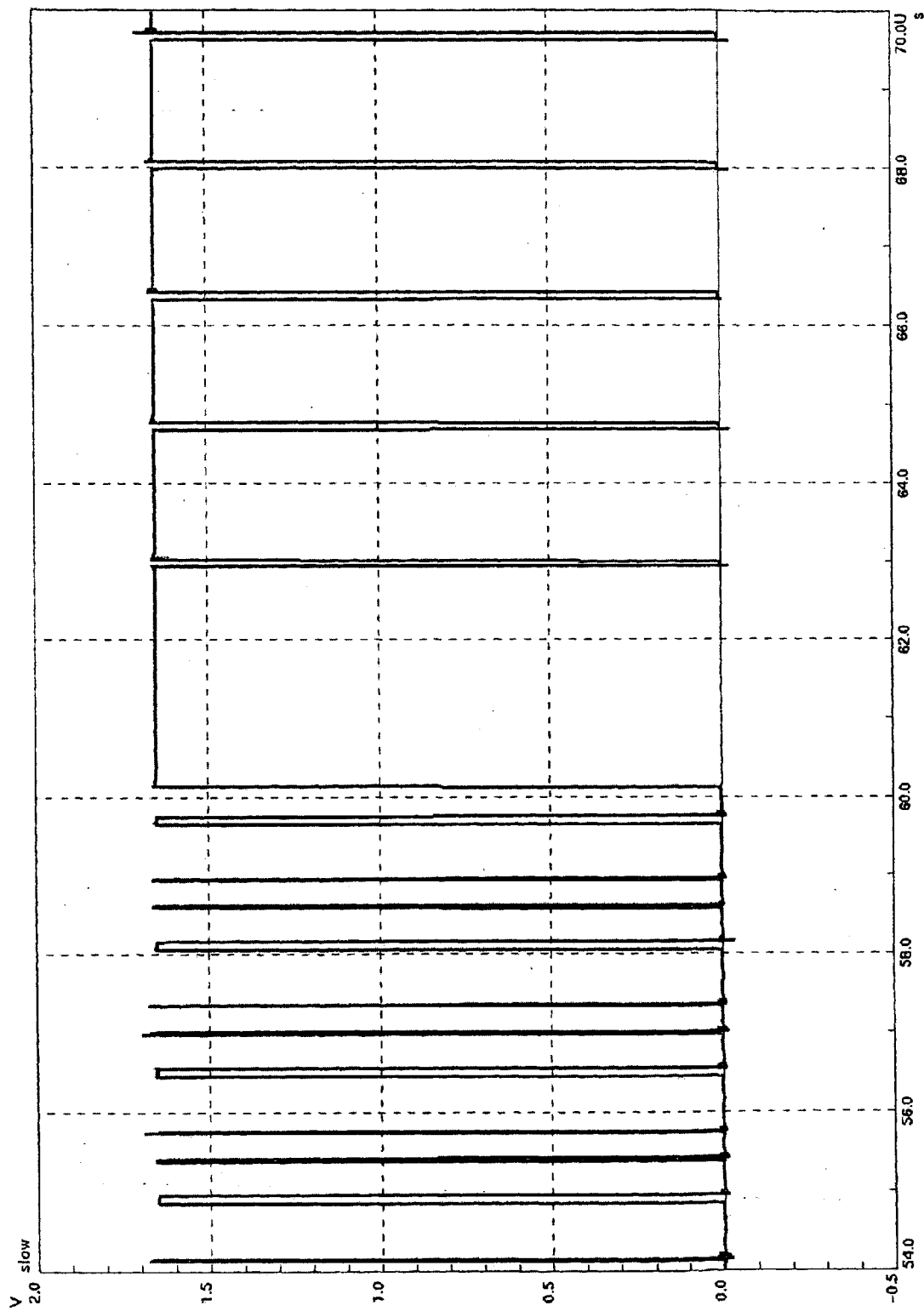
FIG. 15 shows the frequency variation of the control signal slow according to the present invention.

FIG. 15 illustrates the variation of a duty-cycle that the slow signal undergoes when switching from a condition of regulation with a load current of 80 $\mu$A to a condition of regulation with a zero load. It may be noticed that the filter switches from a situation in which its cut-off frequency is generally the highest frequency (in the example 150 kHz), to a situation in which it filters the high frequency clock signal with a reduced cut-off frequency (in the example of about 22 kHz).

Figure 16A:
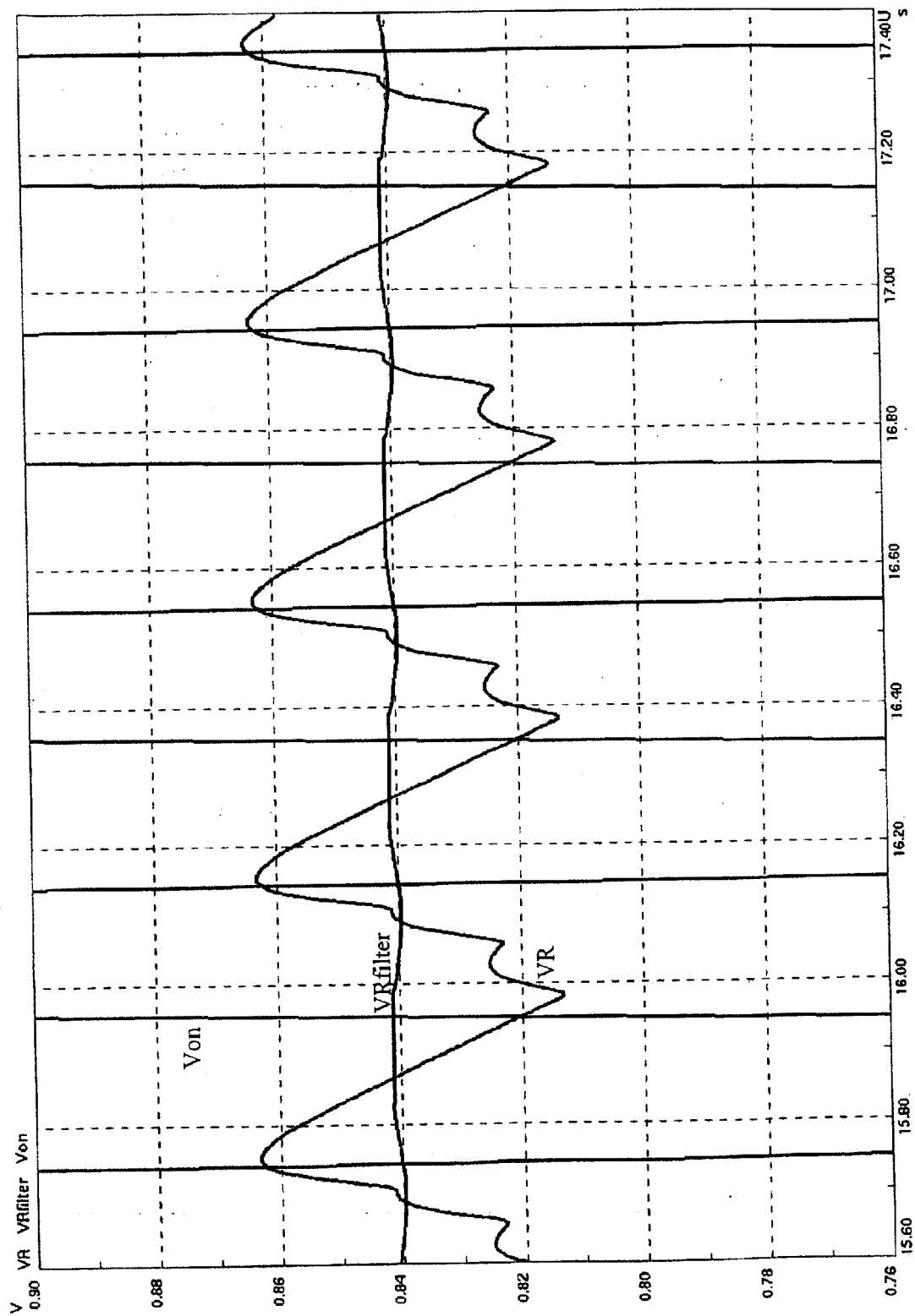
FIGS. 16a and 16b are diagrams of $V_R$ and $V_{Rfilter}$ with regulation at 40 $\mu$A and at a zero load according to the present invention.
Figure 16B:
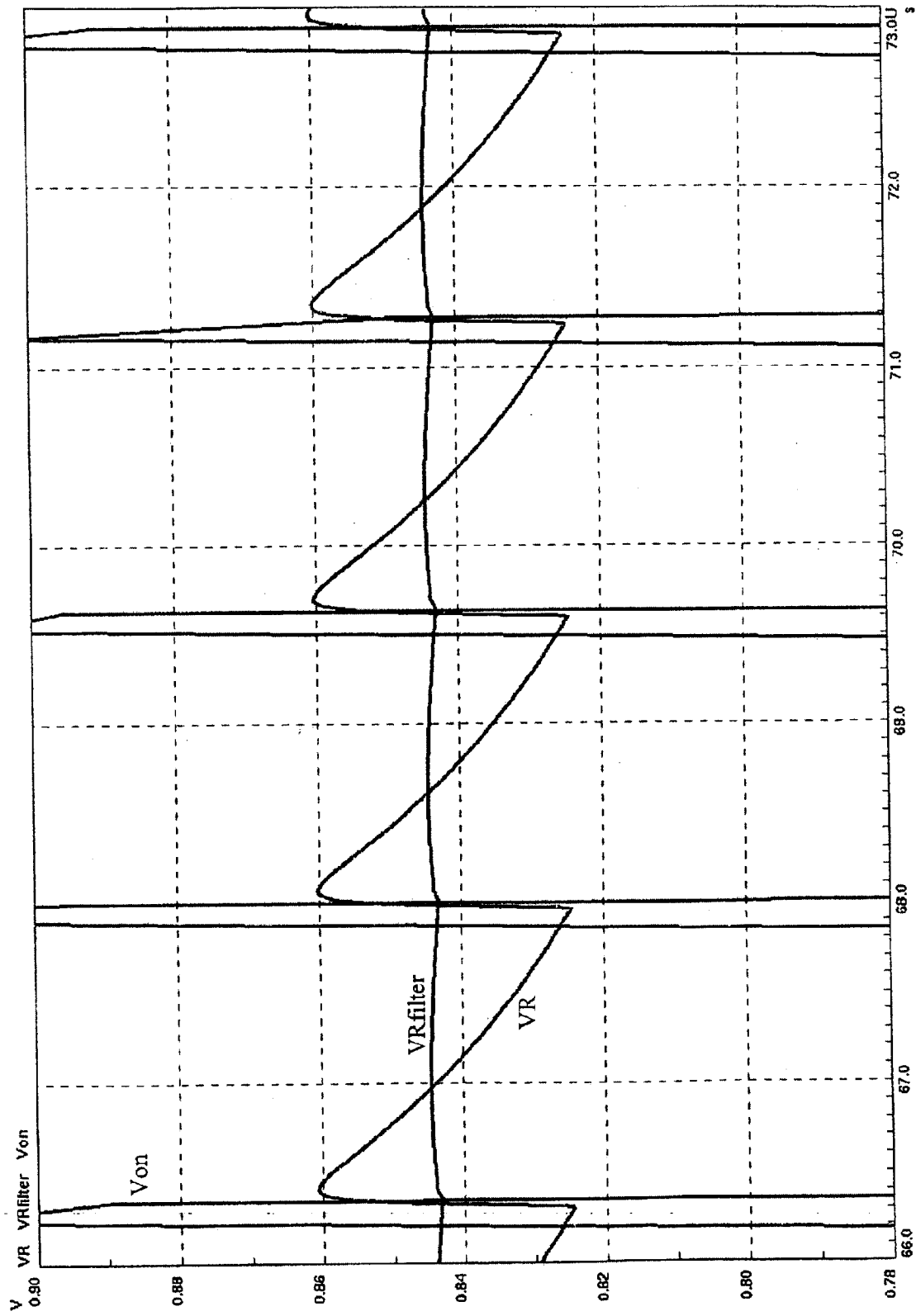

FIG. 16a and FIG. 16b show the waveforms of $V_R$ and of $V_{Rfilter}$ in two different conditions, with a 40 $\mu$A load current (FIG. 16a) and with no load (FIG. 16b). The filtered signal $V_{Rfilter}$ constitutes an offset that being input to the comparator, tends to rebalance the shift of $V_R$ from the reference value. As may be verified for both cases, the waveform of $V_R$ appears to be well centered around the value of $V_{BG}$ (that in the example considered is about 840 mV).

That which is claimed is:

1. A circuit for regulating an output voltage of a charge pump, the circuit comprising:
    a regulator connected to an output of the charge pump and comprising
        a voltage divider for dividing the output voltage,
        a comparator having a first input for receiving a divided output voltage, a second input for receiving a reference voltage, and an output for providing a digital signal,
        an integrating circuit connected to the output of said comparator for providing a control signal based upon an inverted digital signal, and
        a low-pass filter having a first input, for receiving the divided output voltage, a second input for receiving the control signal from said integrating circuit, and an output for providing a filtered divided output voltage, said low-pass filter having a time constant that is switched between at least two values as a function of the control signal,
        said comparator having a third input connected to the output of said low-pass filter so that the digital signal is based upon the divided output signal, the reference voltage and the filtered divided output voltage;
    a logic control circuit having a first input for receiving a clock signal, a second input for receiving the digital signal from said comparator, and an output for providing a timing signal for the charge pump; and
    a phase generator circuit having an input for receiving the timing signal from said logic control circuit, and an output for providing control phases for the charge pump.

2. A circuit according to claim 1, wherein the timing signal has a frequency determined by a state of the digital signal at every pulse of the clock signal.

3. A circuit according to claim 1, wherein said low-pass filter comprises an RC filter comprising:
- a first resistor for providing a first fixed resistance of said RC filter;
- at least one second resistor connected in series with said first resistor for providing an added resistance to the first fixed resistance;
- a capacitor connected to said at least one second resistor; and
- a switch for adaptively short-circuiting said at least one second resistor so that the added resistance is not added to the first fixed resistance, said switch being driven by the control signal from said integrating circuit.

4. A circuit according to claim 1, wherein said comparator comprises a first gain branch from which the digital signal is derived, said first gain branch comprising:
- an NMOS transistor being driven by the filtered divided output voltage from said low-pass filter; and
- a plurality of NMOS transistors connected together in series and connected in parallel to said NMOS transistor, said plurality of NMOS transistors being identical to said first NMOS transistor and being driven by the divided output voltage from said voltage divider.

5. A circuit according to claim 4, wherein said comparator comprises a second gain branch comprising:
- an NMOS transistor being driven by the reference voltage; and
- a plurality of NMOS transistors connected together in series and connected in parallel to said NMOS transistor, said plurality of NMOS transistors being identical to said first NMOS transistor and being driven by the reference voltage.

6. A circuit for regulating an output voltage of a charge pump, the circuit comprising:
- a regulator connected to an output of the charge pump and comprising
  - a voltage divider for dividing the output voltage,
  - a filter having a first input for receiving a divided output voltage, a second input for receiving a control signal, and an output for providing a filtered divided output voltage, and
  - a comparator having a first input for receiving the divided output voltage, a second input for receiving a reference voltage, a third input for receiving the filtered divided output voltages and an output for providing a digital signal based upon the divided output signal, the reference voltage and the filtered divided output voltage;
  - a logic control circuit having a first input for receiving a clock signal, a second input for receiving the digital signal from said comparator, and an output for providing a timing signal; and
  - a phase generator circuit having an input for receiving the timing signal from said logic control circuit for generating control phases for the charge pump.

7. A circuit according to claim 6, wherein said regulator further comprises an integrating circuit connected to the output of said comparator for receiving an inverted digital signal, and providing the control signal to said filter based upon the inverted digital signal.

8. A circuit according to claim 6, wherein said filter has a time constant that is switched between at least two values as a function of the control signal.

9. A circuit according to claim 6, wherein the timing signal provided by said logic control circuit has a frequency determined by a state of the digital signal at every pulse of the clock signal.

10. A circuit according to claim 7, wherein said filter comprises an RC filter comprising:
- a first resistor for providing a first fixed resistance of said RC filter;
- a second resistor connected in series with said first resistor for providing an added second resistance to the first fixed resistance;
- a capacitor connected to said second resistor; and
- a switch for adaptively short-circuiting said second resistor so that the second resistance is not added to the first fixed resistance, said switch being driven by the control signal from said integrating circuit.

11. A circuit according to claim 6, wherein said comparator comprises a first gain branch from which the digital signal is derived, said first gain branch comprising:
- an NMOS transistor being driven by the filtered divided output voltage from said filter; and
- a plurality of NMOS transistors connected together in series and connected in parallel to said NMOS transistor, said plurality of NMOS transistors being identical to said first NMOS transistor and being driven by the divided output voltage from said voltage divider.

12. A circuit according to claim 11, wherein said comparator comprises a second gain branch comprising:
- an NMOS transistor being driven by the reference voltage; and
- a plurality of NMOS transistors connected together in series and connected in parallel to said NMOS transistor, said plurality of NMOS transistors being identical to said first NMOS transistor and being driven by the reference voltage.

13. A device comprising:
- a charge pump;
- a regulator connected to an output of said charge pump for regulating an output voltage therefrom, said regulator comprising
  - a voltage divider for dividing the output voltage,
  - a filter having a first input for receiving a divided output voltage, a second input for receiving
  - a control signal, and an output for providing a filtered divided output voltage, and
  - a comparator having a first input for receiving the divided output voltage, a second input for receiving a reference voltage, a third input for receiving the filtered divided output voltage, and an output for providing a digital signal based upon the divided output signal, the reference voltage and the filtered divided output voltage;
- a logic control circuit having a first input for receiving a clock signal, a second input for receiving the digital signal from said comparator, and an output for providing a timing signal; and
- a phase generator circuit having an input for receiving the timing signal from said logic control circuit for generating control phases for said charge pump.

14. A device according to claim 13, wherein said regulator further comprises an integrating circuit connected to the output of said comparator for receiving an inverted digital signal, said integrating circuit providing the control signal to said filter based upon the inverted digital signal.

15. A device according to claim 13, wherein said filter has a time constant that is switched between at least two values as a function of the control signal.

16. A device according to claim 13, wherein the timing signal provided by said logic control circuit has a frequency determined by a state of the digital signal at every pulse of the clock signal.

17. A device according to claim 14 wherein said filter comprises an RC filter comprising:
   a first resistor for providing a first fixed resistance of said RC filter;
   a second resistor connected in series with said first resistor for providing an added second resistance to the first fixed resistance;
   a capacitor connected to said second resistor; and
   a switch for adaptively short-circuiting said second resistor so that the second resistance is not added to the first fixed resistance, said switch being driven by the control signal from said integrating circuit.

18. A device according to claim 13, wherein said comparator comprises a first gain branch from which the digital signal is derived, said first gain branch comprising:
   an NMOS transistor being driven by the filtered divided output voltage from said low-pass filter; and
   a plurality of NMOS transistors connected together in series and connected in parallel to said NMOS transistor, said plurality of NMOS transistors being identical to said first NMOS transistor and being driven by the divided output voltage from said voltage divider.

19. A device according to claim 18, wherein said comparator comprises a second gain branch comprising:
   an NMOS transistor being driven by the reference voltage; and
   a plurality of NMOS transistors connected together in series and connected in parallel to said NMOS transistor, said plurality of NMOS transistors being identical to said first NMOS transistor and being driven by the reference voltage.

20. A method for regulating an output voltage of a charge pump, the method comprising:
   dividing the output voltage from the charge pump for providing a divided output voltage;
   filtering the divided, output voltage for providing a filtered divided output voltage;
   generating a digital signal based upon the divided output signal, a reference voltage and the filtered divided output voltage;
   generating a timing control signal using a logic control circuit having a first input for receiving a clock signal, and a second input for receiving an inverted digital signal; and
   generating control phases for the charge pump using a phase generator circuit having an input receiving the timing signal.

21. A method according to claim 20, wherein the filtering is performed using a filter; wherein generating the digital signal is performed using a comparator having a first input for receiving the divided output voltage, a second input for receiving the reference voltage, and third input for receiving the filtered divided output voltage; and further comprising:
   inverting the digital signal; and
   generating a control signal for the filter based upon the inverted digital signal.

22. A method according to claim 21, wherein the filter has a time constant that is switched between at least two values as a junction of the control signal.

23. A method according to claim 20, wherein the timing signal provided by the logic control circuit has a frequency determined by a state of the digital signal at every pulse of the clock signal.

24. A method according to claim 21, wherein the filter comprises an RC filter comprising a first resistor for providing a first fixed resistance of the RC filter, a second resistor connected in series with the first resistor for providing an added second resistance to the first fixed resistance, a capacitor connected to the second resistor; and further comprising short-circuiting the second resistor so that the second resistance is not added to the first fixed resistance.

25. A method according to claim 24, wherein the RC filter further comprises a switch for adaptively short-circuiting the second resistor, the switch being driven by the control signal from the integrating circuit.

* * * * *

UNITED STATES PATENT AND TRADEMARK OFFICE
CERTIFICATE OF CORRECTION

Figure 1:
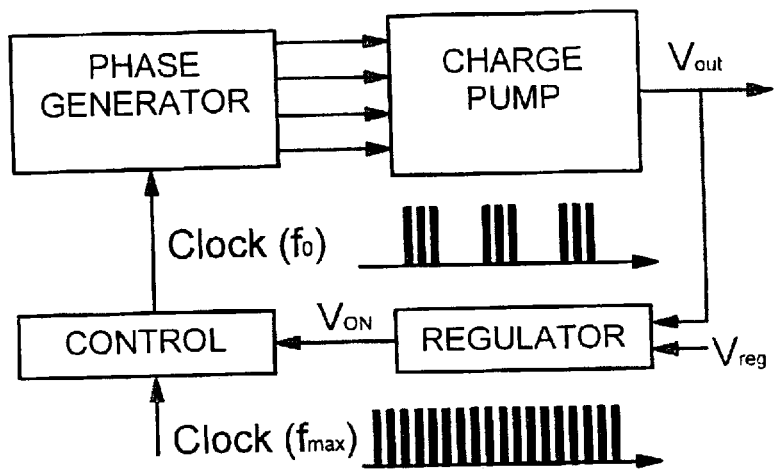
FIG. 1 is a commonly known block diagram of the regulating loop of a charge pump according to the prior art.

PATENT NO.      : 6,774,709 B2
DATED           : August 10, 2004
INVENTOR(S)     : Enrico Castaldo and Antonino Conte It is certified that error appears in the above-identified patent and that said Letters Patent is hereby corrected as shown below:

Drawing,
Sheet 1 of 16, delete informal Drawing FIG. 1;
insert --

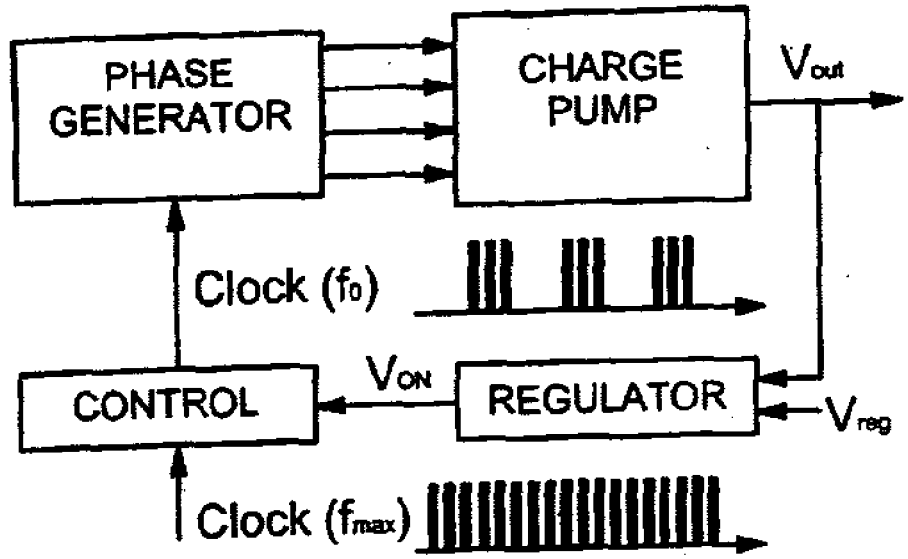

FIG. 1
(PRIOR ART)

--

UNITED STATES PATENT AND TRADEMARK OFFICE
CERTIFICATE OF CORRECTION

Figure 2:
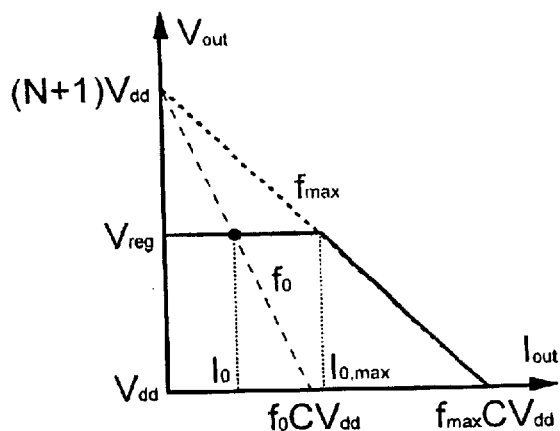
FIG. 2 illustrates the characteristics of the regulated charge pump of FIG. 1.
Figure 3:
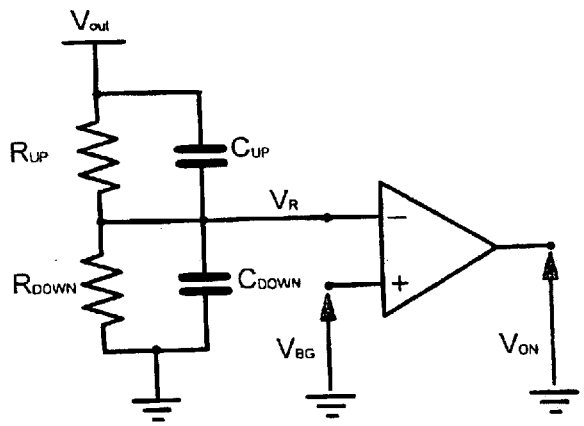
FIG. 3 shows a commonly used circuit for implementing the regulator block according to the prior art.

PATENT NO. : 6,774,709 B2
DATED : August 10, 2004
INVENTOR(S) : Enrico Castaldo and Antonino Conte It is certified that error appears in the above-identified patent and that said Letters Patent is hereby corrected as shown below:

Drawings, (cont'd)
Sheet 1 of 16, delete informal Drawing FIG. 2 and 3;
insert --

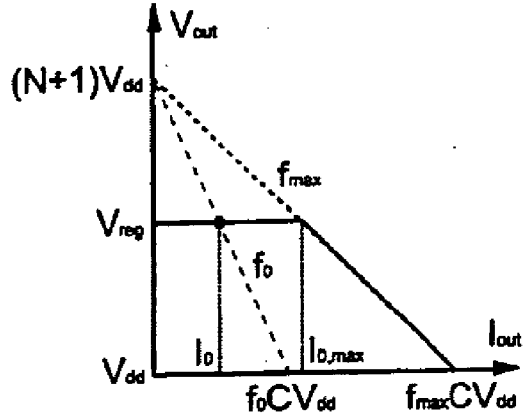

FIG. 2
(PRIOR ART)

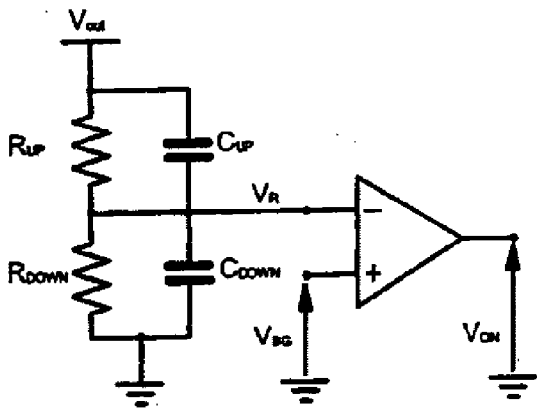

FIG. 3
(PRIOR ART)

--

UNITED STATES PATENT AND TRADEMARK OFFICE
CERTIFICATE OF CORRECTION

Figure 4:
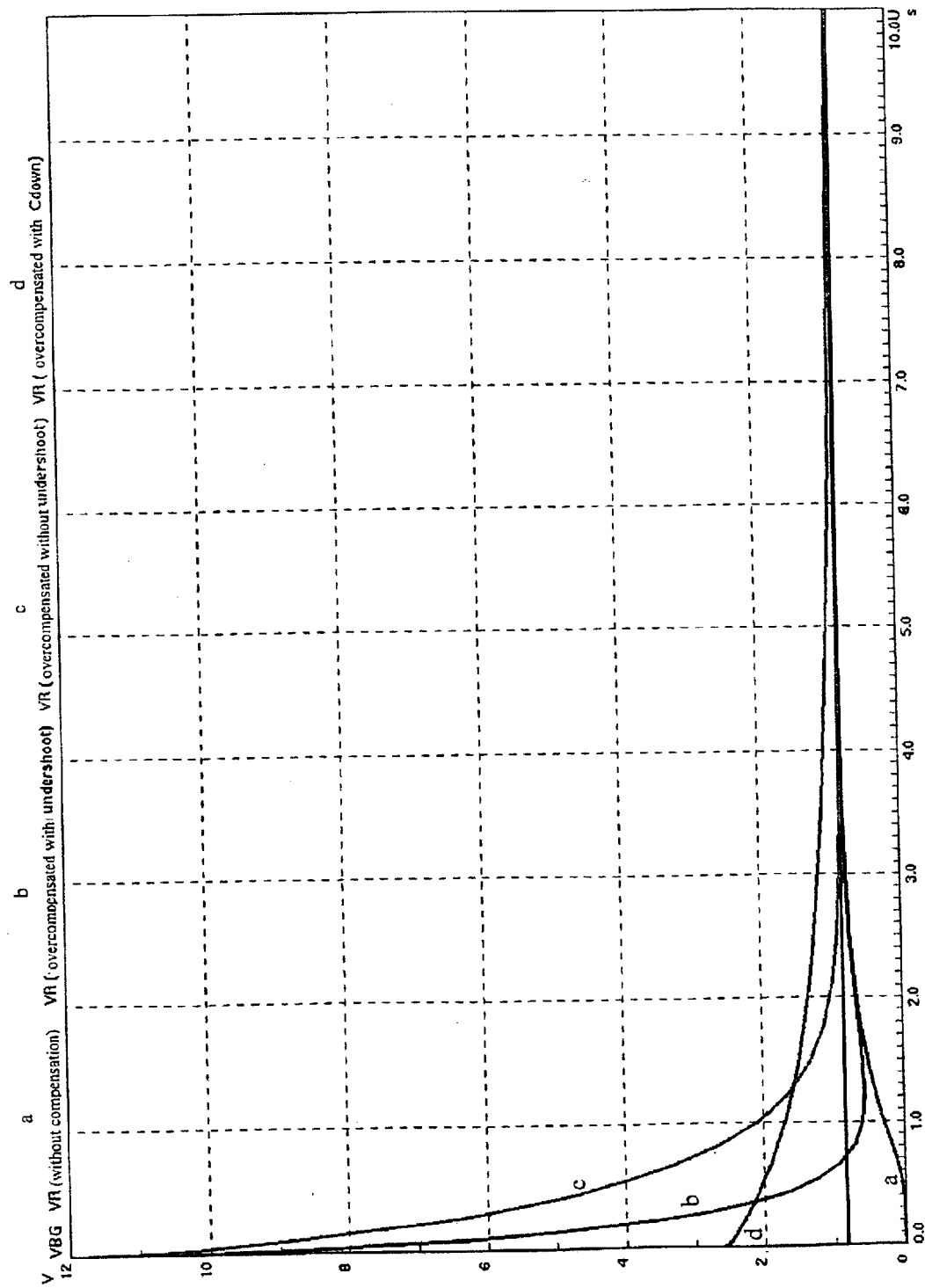
FIG. 4 illustrates the step response of the regulation circuit of FIG. 3.

PATENT NO. : 6,774,709 B2
DATED : August 10, 2004
INVENTOR(S) : Enrico Castaldo and Antonino Conte It is certified that error appears in the above-identified patent and that said Letters Patent is hereby corrected as shown below:

<u>Drawings, (cont'd)</u>
Sheet 2 of 16 delete informal Drawing FIG. 4
insert --

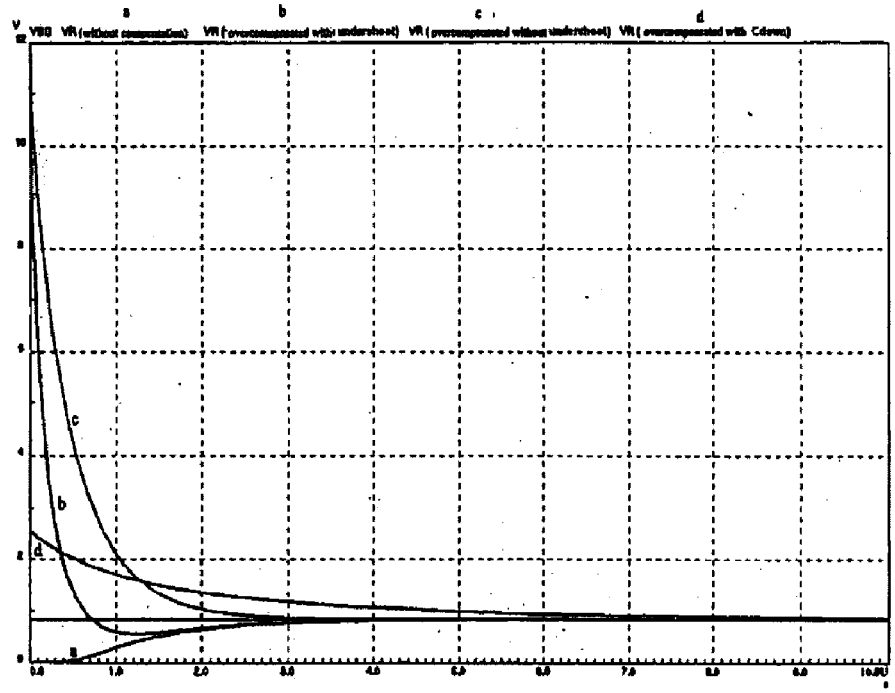

FIG. 4
(PRIOR ART)

--

Signed and Sealed this

Fifteenth Day of March, 2005

JON W. DUDAS
*Director of the United States Patent and Trademark Office*